Figure 1:
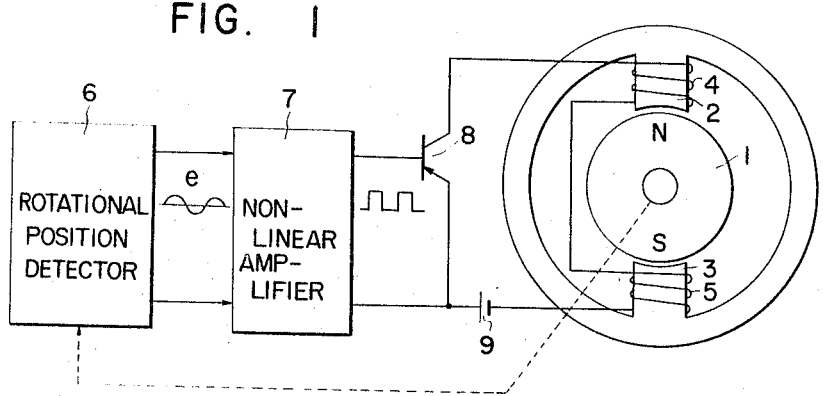

Feb. 21, 1967  KAZUTOSHI IKEGAMI  3,305,713
DIRECT CURRENT BRUSHLESS MOTOR INCLUDING PULSE WIDTH MODULATION
Filed Jan. 2, 1964  3 Sheets-Sheet 1

INVENTOR.
Kazutoshi Ikegami
BY
Mestern & Mestern

DETECTOR
OSCILLATOR

INVENTOR.
Kazutoshi Ikegami

Feb. 21, 1967  KAZUTOSHI IKEGAMI  3,305,713
DIRECT CURRENT BRUSHLESS MOTOR INCLUDING PULSE WIDTH MODULATION
Filed Jan. 2, 1964  3 Sheets-Sheet 3

INVENTOR.
Kazutoshi Ikegami
BY
Mestern & Mestern

United States Patent Office 3,305,713
Patented Feb. 21, 1967

3,305,713
DIRECT CURRENT BRUSHLESS MOTOR INCLUDING PULSE WIDTH MODULATION
Kazutoshi Ikegami, Kitatama-gun, Tokyo-to, Japan, assignor to Kabushiki Kaisha Hitachi Seisakusho, Tokyo-to, Japan, a joint-stock company of Japan
Filed Jan. 2, 1964, Ser. No. 335,147
1 Claim. (Cl. 318—138)

This invention relates to D.-C. brushless motors and more particularly to D.-C. brushless motors comprising a no-contact mechanism for controlling the armature current in accordance with the rotational position of the rotor.

A conventional D.-C. motor requires a means for switching the current supply to the armature winding in accordance with the position of the rotor, but since such a current switching means consists of a mechanical contact mechanism comprising brushes and commutators, the motor has such defects as much noise, frequent breakdowns, and difficult maintenance.

For the purpose of eliminating the above defects, there has been developed a type of D.-C. motor in which the said functions of the brushes and commutators are performed by a no-contact mechanism.

In the case of previously disclosed no-contact motors, however, a no-contact mechanism is used as a means of detecting a signal corresponding to the rotational position of the rotor in such a manner, for example, that an induced electromotive force is caused to be produced in a control winding provided in the periphery of the rotor of permanent magnet type, the said electromotive force thus produced which corresponds to the rotation of the said rotor then being amplified by transistors into the armature current.

Furthermore, there is another known method in which a Hall element, instead of the said control winding, is used, whereby the electromotive force of the said Hall element is amplified by transistors into the armature current.

There is a further method in which a high frequency signal is used as an auxiliary signal which will be explained later.

It will be seen that in each of the above mentioned methods the transistors are used for the purpose of supplying comparatively large current to the armature windings. Moreover, control of the speed of rotation (of the rotor) is usually achieved by changing the magnitude of the armature current. That is, the rotational speed is controlled by a change in the amplitude of the current flowing in the said transistors. However, as is well known, a transistor shows extremely small power loss when it is in a saturated condition or in a cut-off condition, but the power loss increases when the transistor is in an intermediate condition between the said two conditions.

Consequently, it is desirable to have the said transistor in either the saturated or the cut-off condition, i.e., to cause it to undergo on-off action, in each of the abovementioned types of no-contact motors wherein the output current of the transistors is to be supplied to the armature winding so that the loss may be reduced and the efficiency may be increased.

One object of this invention is to provide a no-contact D.-C. motor which is provided with means to reduce the loss in the control circuit by causing the transistors to undergo an off action.

Another object of this invention is to provide a no-contact motor wherein the rotation speed is controlled by changing the conduction time of the armature current, while the amplitude of the said armature current is maintained constant.

Still another object of this invention is to provide a no-contact motor having an extremely large starting torque through the use of a high frequency signal used as an auxiliary signal for detecting the position of the rotor.

Figure 3:
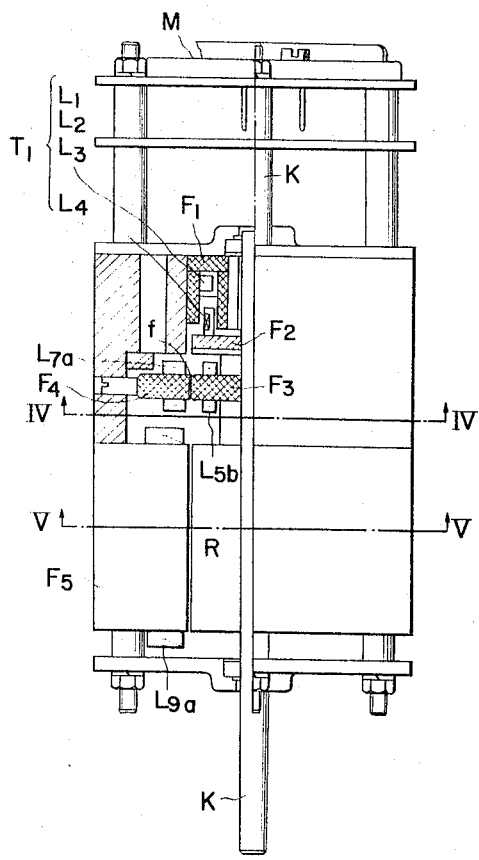
Figure 4:
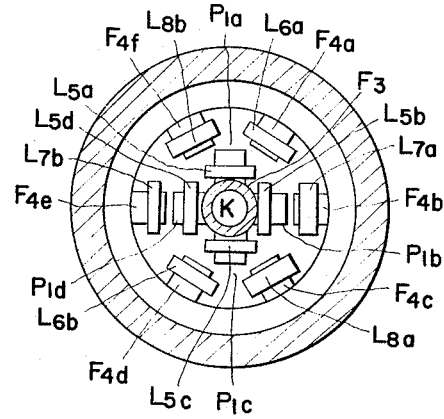
Figure 5:
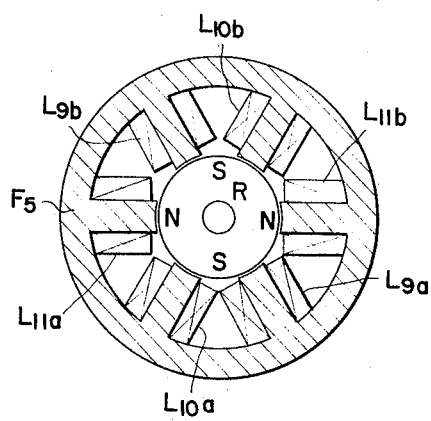
Figure 2:
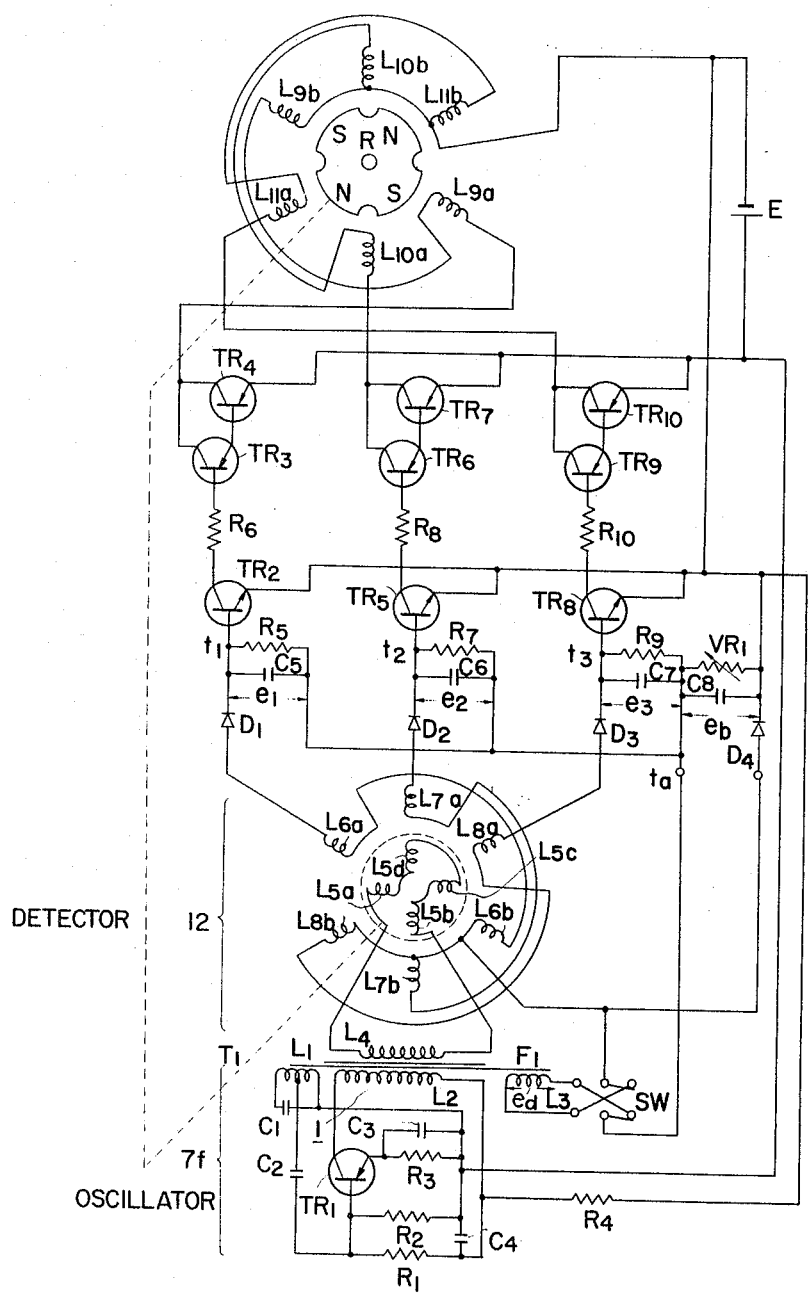
Figure 6:
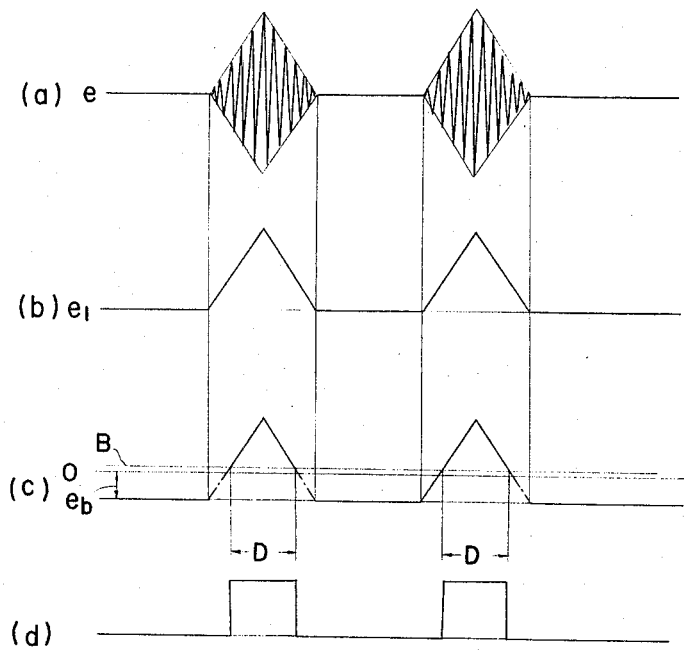
Figure 7:
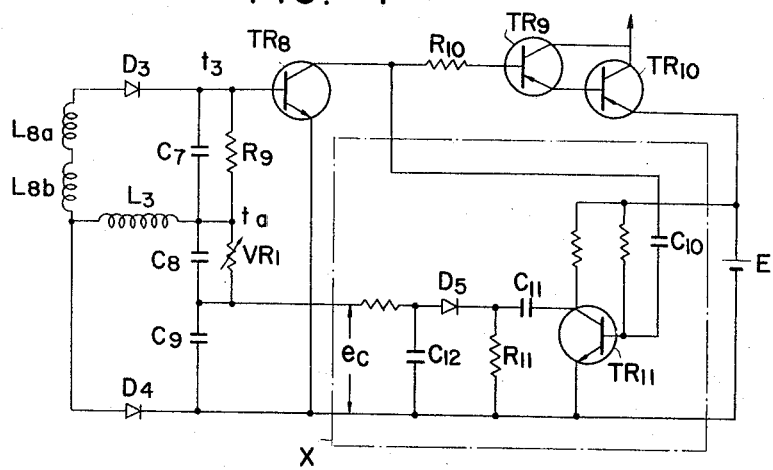

These and other objects of this invention will become more apparent upon consideration of the following description of a preferred embodiment thereof, when taken in connection with the attached drawings, in which:

FIG. 1 is a schematic diagram indicating the principle of the invention;
FIG. 2 is a circuit diagram showing a specific embodiment of the invention;
FIG. 3 is a side view, partly in longitudinal section, showing the construction of a motor for which the use of the circuit shown in FIG. 2 is suitable;
FIG. 4 is a cross-sectional view taken along the plane indicated as IV—IV in FIG. 3;
FIG. 5 is a cross-sectional view taken along the plane indicated as V—V in FIG. 3;
FIG. 6 is a waveform diagram to be referred to in a description of the operation of the embodiment of the invention; and
FIG. 7 is a circuit diagram indicating a circuit suitable for control of the motor speed.

Referring to the drawings, the basic composition of the embodiment of this invention, as shown in FIG. 1, consists of a permanent magnet 1, armature cores 2 and 3, stator exciting windings 4 and 5, a rotor position detecting means for detecting the rotational position of the rotor 1 by any of the above-mentioned means and generating a detection signal $e$, an amplifier circuit 7 for converting the detection signal $e$ into a rectangular wave signal, a power transistor 8, the on-off operation of which is controlled by the output of said amplifier circuit, and a D.-C. power source 9.

The said detection signal $e$ is normally detected as a sine wave, which signal is amplified in the following amplifier circuit 7 and at the same time is converted into a rectangular wave signal. The said rectangular wave signal is impressed across the base and emitter of the power transistor 8, whereby said transistor 8 is controlled to be in either in a saturated high-conductive state or a cut-off state. It is when the said transistor 8 is in the saturated conductive state that an armature current flows from the D.-C. power source 9 to the armature windings 4 and 5, with the result that an electromotive force is produced between the stator and the rotor, thereby causing the rotor 1 to rotate in a certain direction.

The said amplifier circuit 7 may be composed, for example, of multistage transistors direct-coupled so as to perform non-linear amplification, or otherwise may be composed of a one shot multivibrator with a positive feedback circuit provided within the direct-coupled amplifier circuit of transistors, whereby the non-linear transfer characteristic is utilized in the circuit used for generating a rectangular wave output. In such a case, there is a possibility that the control signal $e$ may be detected as a direct rectangular wave instead of as a sine wave as shown in FIG. 6($a$), in which event the amplifier circuit 7 with only a linear transfer characteristic will be sufficient to effect on-off control of the transistor. It is also possible to obtain a rectangular wave output through the combination of the amplifier circuit 7 and transistor 8. When switching action of a power transistor 8 is effected in such a manner, the power loss is extremely small, and the over-all efficiency tends to become larger. The method of inserting transistors in an armature winding in series, thereby effecting the switching of the transistors, has already been in practice with respect to a motor with brushes. In such a case, a detection signal related to the position of the rotor is not impressed on the transistor, and therefore such a motor is substantially different from the brushless motor of the present invention.

The motor shown in FIG. 1 indicates only the basic principle thereof without revealing any specific structure thereof. For the detecting means 6 of the position of the rotor, any of the previously known no-contact detecting means as mentioned above may be used.

Next, the invention will be described as embodied in actual cases where the most practical high-frequency signal is to be used as an auxiliary signal for the rotor position detecting means 6.

Referring to FIG. 2, numeral 11 indicates a high frequency oscillator, comprising a transistor $TR_1$, resistors $R_1$, $R_2$, and $R_3$; capacitors, $C_1$, $C_2$, $C_3$, and $C_4$; and the fixed coils $L_1$ and $L_2$ of a transformer $T_1$. Said coils, $L_1$ and $L_2$, are coupled electromagnetically to each other and form a Harley oscillator.

The said transformer $T_1$ consists of said two coils $L_1$ and $L_2$ for said oscillator and a third coil $L_3$ for a phase discriminator, said three coils being wound about a troidal core $F_1$, as well as a fourth coil $L_4$, which is wound about a second rotor core $F_2$ supported by a rotor shaft K, both cores $F_1$ and $F_2$ being separated by an extremely small clearance therebetween so that the output of the oscillator 1 can be induced in the rotary coil $L_4$ at all times regardless of the rotation of $F_2$. The high frequency signal which has been produced in the said rotary coil $L_4$ is supplied to second rotary coils $L_{5a}$, $L_{5b}$, $L_{5c}$, and $L_{5d}$ within a detecting means 2. Said four rotary coils $L_{5a}$ through $L_{5d}$ are wound about each of four poles, $P_{1a}$, $P_{1b}$, $P_{1c}$ and $P_{1d}$, respectively, which are spaced at equal intervals on a second rotary core $F_3$ and are made to rotate together with the rotor shaft K. Each of said cores, $F_1$, $F_2$, and $F_3$ as well as each of the poles $P_{1a}$ through $P_{1d}$ is made of high frequency magnetic material. Each of the detecting coils $L_{6a}$, $L_{6b}$, $L_{7a}$, $L_{7b}$, $L_{8a}$, and $L_{8b}$ is wound about one of six detecting poles, $F_{4a}$ through $F_{4f}$, respectively, said poles being provided at equal intervals, so that each of said detecting coils can form a magnetic couple with any one of said second rotary coils. The construction of said detecting means 12 is shown in FIG. 4, wherein the width in the rotary direction of the each end of the rotary poles $P_{1a}$–$P_{1d}$ is same as the width of each of the detecting poles $F_{4a}$–$F_{4f}$. The fixed detecting coils in the said detecting means 12 are so arranged that each set of mutually confronting coils, i.e., $L_{6a}$ and $L_{6b}$, $L_{7a}$ and $L_{7b}$, $L_{8a}$ and $L_{8b}$, is connected in series, respectively, and high frequency signals which have been produced simultaneously in the two coils of each of said sets are added together.

The high frequency signals which have been produced in each set of said coils are phase-detected by means of the discriminating signal $e_d$ which is constantly being produced in the discriminating coil $L_3$. Only when both signals are in phase, the above high frequency signals are utilized as the detection signals of the rotational angle. That is, if the rotary coils $L_{5b}$ and $L_{5d}$ are in such position as indicated in FIG. 2, the high frequency signal which has been supplied from the oscillator 1 through the rotary coil $L_4$ to $L_{5a}$–$L_{5d}$ will be led to the detecting coils $L_{7a}$ and $L_{7b}$ by induction. When the high frequency signals produced in said both coils are in-phase with the discriminating high frequency signal $e_d$, a signal which is the sum of said both signals is applied to the detection circuit composed of a diode $D_2$, resistance $R_7$, and capacitor $C_6$, thereby producing a detecting signal $e_2$ between its output terminals $t_2$–$t_a$. Referring to FIG. 2, when the position is changed by a 30° rotation to the right, a detection signal $e_1$ is produced between the terminals $t_1$–$t_a$ by the coupling between the coils $L_{5a}$ and $L_{6a}$, as well as $L_{5c}$ and $L_{6b}$. When the position is further rotated by 30° to the right, a detection signal $e_3$ is produced between the terminals $t_3$–$t_a$. Thus, it can be seen that detection signals $e_1$, $e_2$, $e_3$ are produced successively in each of the detection circuits in accordance with the rotational angle of the rotor shaft K. In addition to being used for phase detection as mentioned above, the discriminating high frequency signal $e_d$ is used also for the generation of a counter bias voltage $e_b$ after having been converted to direct current in a rectifier composed of a diode $D_4$, capacitor $C_8$, and variable resistor $VR_1$. Transistors $TR_2$, $TR_5$, $TR_8$ are used for amplification of the detection signals $e_1$, $e_2$, and $e_3$, respectively. Transistors $TR_3$, $TR_4$, $TR_6$, $TR_7$, $TR_9$, and $TR_{10}$ compose a switching transistor circuit, having a non-linear transfer characteristic similarly as the said transistors $TR_2$, $TR_5$, and $TR_8$, and are so arranged that a rectangular wave current flows in its output. A 4-pole permanent magnet rotor R is provided. Each of armature coils $L_{9a}$, $L_{9b}$, $L_{10a}$, $L_{10b}$, $L_{11a}$, and $L_{11b}$, as shown in FIG. 5 is wound about the stator core $F_5$. The circuit of FIG. 2 is provided with D.-C. power source E. In FIG. 3, the character M indicates the distribution heat for the transistor circuit. With the above mentioned arrangement, high frequency induced voltage produced in each of the detecting coils $L_{6a}$ through $L_{8b}$ in accordance with the rotational position of the rotor will be of a diamond shape as shown at (a) in FIG. 6 due to the fact that the width of the end face $f$ of each of the rotary poles $P_{1a}$–$P_{1d}$ is made almost the same as the width of the stator detection poles $F_{4a}$–$F_{4f}$, with the signal thereof being detected in each of the detection circuit. Taking the transistor circuit $TR_2$, for example, the detection voltage $e_1$ produced between the terminals $t_1$–$t_a$ is a triangular wave as shown in FIG. 6(b). This triangular wave voltage $e_1$ is overlapped with the counted bias voltage $e_b$, and thereby a voltage $e_1$–$e_b$ ($e_1 > e_b$) is added between the base and emitter of the transtor $TR_2$, in the forward direction. The voltage waveform in said forward direction is shown in FIG. 6(c). The transistor $TR_2$ becomes "on" when the voltage between the said base and emitter is above a certain level B, and becomes "off" when the same is below the said B level, with the output current waveform becoming a rectangular wave as shown in FIG. 6(d). This rectangular wave current drives transistor circuits $TR_3$ and $TR_4$ in the output stage, thereby causing a rectangular wave drive current to flow into the armature windings $L_{9a}$ and $L_{9b}$. The width D of said rectangular wave signal varies according to the magnitude of the counter bias voltage $e_b$. Hence, the rotational speed can be controlled by adjusting the variable resistor $VR_1$. When a voltage is added in proportion to the rotational speed in the circuit in which the said counter bias voltage $e_b$ is being produced, the said counter bias voltage is either increased or decreased automatically according to the increase or decrease in the rotational speed, with the result that the rectangular wave width of the armature current is automatically caused either to increase or decrease according to the rotational speed, thus making it possible to attain automatic stabilized control of the rotational speed. The automatic stabilized control mentioned above can be realized, for example, by addition of a speed controlling circuit X as shown in FIG. 7 to the circuit shown in FIG. 2. The output of transistor $TR_8$, which is a rectangular wave signal as shown in FIG. 6(d), is put through a coupling capacitor and amplified at transistor $TR_{11}$, thereafter being differentiated at the capacitor $C_{11}$ and resistor $R_{11}$. The differentiated signal takes out a differential pulse at a built-up portion of said rectangular wave signal by the operation of diode $D_5$, said differentiated signal being then integrated by the capacitor $C_{12}$. The integrated output is in proportion to the output frequency of the transistor $TR_8$, i.e., the rotational speed of the rotor. The said integrated output $e_c$ is impressed between the base and emitter of the transistor $TR_8$ (and $TR_2$, $TR_5$) as a counter bias voltage. As a result, for example, when the rotational speed has been increased, the said integrated output $e_c$ increases, and consequently the counter bias voltage $e_b$ of transistor $TR_8$ tends to become larger, whereby, as obvious from the illustrated relationships in FIG. 6, the width of the output rectangular wave decreases, which results in a decrease in the average exciting current flowing in each of the armature coils $L_{9a}$–$L_{11b}$ for driving the rotor as well as a decrease in the rotational speed so as to comply with the specified value of an automatic and stabilized control. When the rotational speed has been decreased below the specified value, an action which is reverse to the above action effects a similarly stabilized control of the rotation speed. In such a case, a better stabilizing control can be accomplished by adding the difference in voltage from the above voltage $e_c$, using the same as a standard voltage, said voltage difference being applied in the form of counter bias voltage. The transistor $TR_{11}$ is not necessary in all cases. For the purpose of generating a voltage $e_c$ which is proportional to the rotational speed in the said control process, generating wirings may be arranged in the periphery of the rotor magnet R so as to utilize the induced voltage produced in said windings. The circuit FIG. 2 is provided with a switch SW for changing over the direction of rotation. The oscillator 11 and detector 12 shown in FIG. 2 correspond to the rotational position detector shown in FIG. 1.

From the foregoing, it can be seen that the no-contact motor of this invention is characterized in that, when the transistors which are connected in series to the armature coils are to be controlled by the detection signal of the position of the rotor, the power loss can be made substantially small with the said transistors operated only in two kinds of states, i.e., a saturated highly conductive state and a non-conductive state. Also, it is another advantageous feature of this invention that by varying the period of time in which the said transistors are kept in a highly conductive state in accordance with the position of the rotor, the stabilization of the rotating speed is accomplished without causing any increase in loss of power. Moreover, means such as that utilizing a high-frequency signal and also generating a triangular wave as the detecting signal as the means for detecting the position of the rotor, as well as that changing the bias voltage in the transistor amplifier circuit as the means for controlling the speed of rotation have contributed much toward the simplification of the circuit. In this case, however, the detection signal can take a saw-tooth shape instead of being a triangular wave. The motor according to this invention has almost the same characteristics as conventional D.-C. shunt motors using brushes and, in addition to having a large starting torque, has excellent stability of rotational speed.

It should be understood, of course, that the foregoing disclosure relates to only a preferred embodiment of the invention and that it is intended to cover all changes and modifications of the example of the invention herein chosen for the purposes of the disclosure, which do not constitute departure from the spirit and scope of the invention as set forth in the appended claim.

What is claimed is:

A D.-C. brushless motor comprising: an oscillator to produce triangular waveform signals; a first coil fixed on a rotational shaft and being supplied with signals from said oscillator by electromagnetic coupling; a plurality of second coils disposed around said rotational axis to be consecutively subjected to electromagnetic coupling; a transistor to amplify triangular waveform voltage generated in said second coil to rectangular waveform voltage; a driving winding in which the rectangular wave signal is supplied; a permanent magnet rotor; means to rectify and smooth a part of output of said oscillator; means to vary the bias of said transistor by this voltage, the width of rectangular output of said transistor being varied by variation of said bias voltage, thereby controlling speed of said rotor.

References Cited by the Examiner

UNITED STATES PATENTS

| | | | |
|---|---|---|---|
| 2,785,236 | 3/1957 | Bright et al. | |
| 2,809,339 | 10/1957 | Guggi | 318—345 X |
| 3,079,539 | 2/1963 | Guerth | 318—341 X |
| 3,131,340 | 4/1964 | Johnson et al. | 318—341 X |
| 3,154,730 | 10/1964 | Houldin et al. | 318—31 X |
| 3,204,165 | 8/1965 | Kreutzer | 318—138 |
| 3,214,663 | 10/1965 | Kreutzer | 318—138 |

FOREIGN PATENTS 1,308,238   9/1962   France.

ORIS L. RADER, *Primary Examiner.*

S. GORDON, G. SIMMONS, *Assistant Examiners.*